Figure 1:
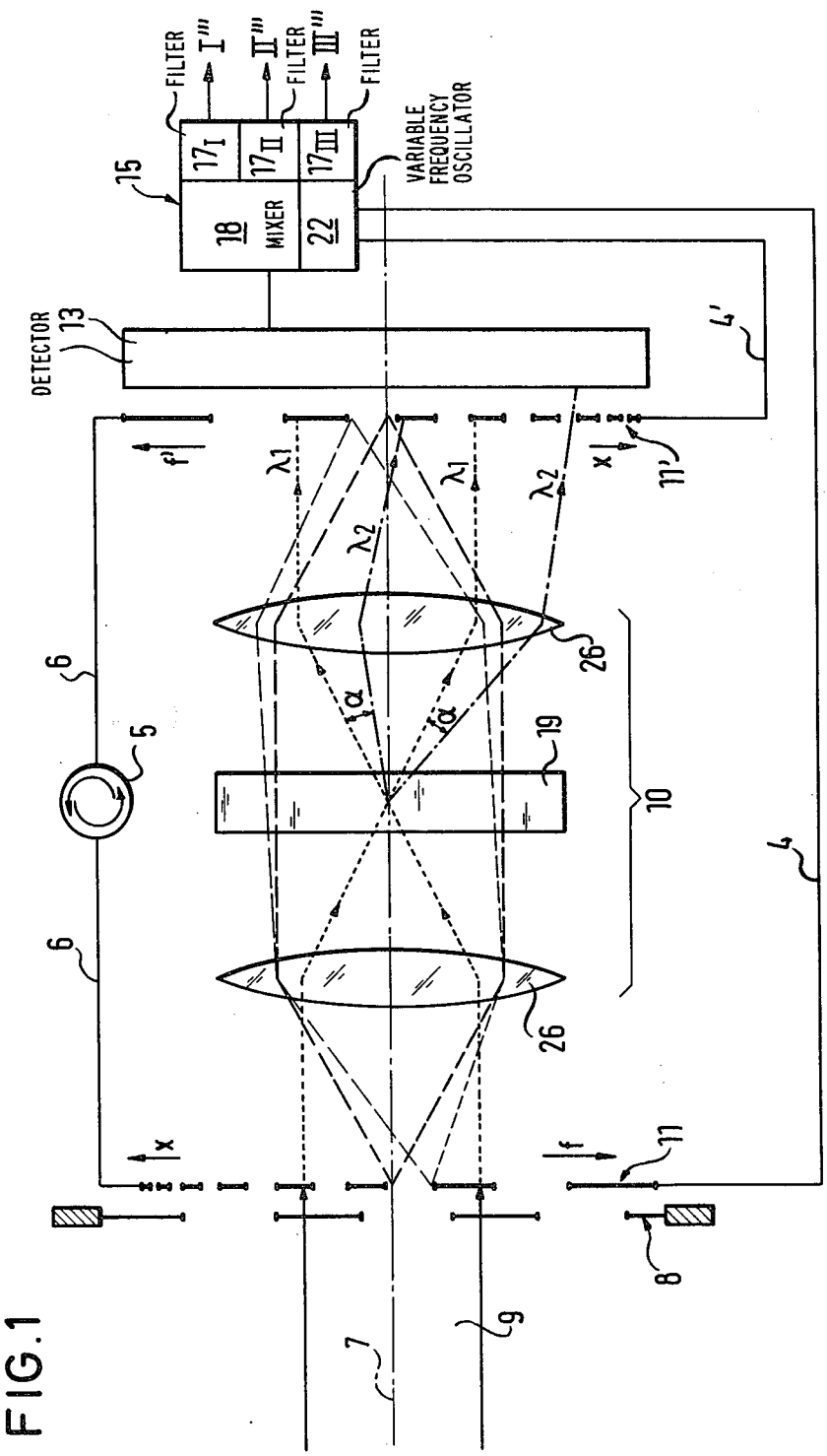

United States Patent [19]

Krause

[11] Patent Number: 4,462,687
[45] Date of Patent: Jul. 31, 1984

[54] APPARATUS FOR SPECTRAL ANALYSIS OF A BROAD BEAM OF RADIATION USING A DISPERSIVE ELEMENT INTERPOSED BETWEEN TWO MODULATORS

[75] Inventor: Gerhard Krause, Rosenheim, Fed. Rep. of Germany

[73] Assignee: Erwin Sick GmbH Optik-Elektronik, Fed. Rep. of Germany

[21] Appl. No.: 325,773

[22] Filed: Nov. 30, 1981

[30] Foreign Application Priority Data

Dec. 1, 1980 [DE] Fed. Rep. of Germany ....... 3045156

[51] Int. Cl.³ .............................................. G01J 3/12
[52] U.S. Cl. .................... 356/326; 356/330
[58] Field of Search ......... 356/300, 326, 328, 330–334

[56] References Cited

U.S. PATENT DOCUMENTS 2,631,489 3/1953 Golay ........................... 356/330 X
3,432,241 3/1969 Girard ............................. 356/330
3,720,469 3/1973 Harwit ............................. 356/310

FOREIGN PATENT DOCUMENTS 2147142 10/1974 Fed. Rep. of Germany .
2526110  1/1976 Fed. Rep. of Germany .
2945608  5/1981 Fed. Rep. of Germany .
3014646 10/1981 Fed. Rep. of Germany ...... 356/325

OTHER PUBLICATIONS

Golay, *Journal of the Optical Society of America*, vol. 39, No. 6, Jun. 1949, pp. 437–444.

Primary Examiner—F. L. Evans

[57] ABSTRACT

The present spectrometer features two modulators 11, 11' disposed one on either side of a dispersive member 19 which produces wavelength dependent deflections $\alpha$ of the various spectral components in the radiation. In other words the precise angle of deflection $\alpha$ is a function of wavelength. The dispersive element 19 is conveniently positioned between two lenses 26 which form a telecentric system with a magnification of one. The lens system is used to produce an image of the first modulator on the second modulator. Each of the modulators is preferably a grating with a linearly varying grating constant so that the modulators, which move in opposite directions f,f' at constant speed subject the incident radiation to a position dependent modulation. The radiation emerging from the second modulator 11' falls onto a photodetector 13. The arrangement is such that the output signal from the detector 13 contains a number of different frequencies each of which is characteristic of one of the particular spectral components. These frequencies, and thus the information on the individual spectral components can be readily separated using respective band pass filters $17_I$, $17_{II}$, $17_{III}$.

14 Claims, 2 Drawing Figures

APPARATUS FOR SPECTRAL ANALYSIS OF A BROAD BEAM OF RADIATION USING A DISPERSIVE ELEMENT INTERPOSED BETWEEN TWO MODULATORS

The invention relates to an apparatus for spectral analysis and has particular reference to a spectrometer of the kind having a dispersion member or separator through which the radiation to be analysed passes, at least one detector positioned after the dispersion member and an electronic processing circuit for detecting spectral components contained in the spectrum. The function of the dispersion member or separator is to disperse or split up an incoming beam of radiation into a series of spectral components. Probably the simplest example is the normal optical prism which can be used to fan out an incident parallel beam of white light into its spectral components. In this example spectral components at the blue end of the optical spectrum are subjected to a greater deflection than components at the red end of the spectrum. The prism thus has a dispersive effect and one can think in terms of a direction of selection in the form of a line positioned transverse to the radiation emerging from the prism. The individual spectral components will intersect this line at spaced apart positions.

In recent times attention has been paid to the use of modulators in spectrometers to facilitate subsequent electronic evaluation of spectral information.

One apparatus of this kind is described in German patent application No. 30 14 646. In this apparatus light emerging from a slot aperture is split up into an optical spectrum. A modulator which extends spatially parallel to the direction of selection of the spectral components and which has a position dependent modulation function parallel to the direction of selection modulates the intensity of the spectrum in the direction of selection. Light from the modulated spectrum falls on a detector which produces a mixed output signal having component signals related to the individual spectral components. These component signals are separated in an electronic processing circuit to provide information on the individual spectral components by means of special reference frequency signals each of which is directly related to the modulation applied to each of the spectral components. These reference frequency signals are in fact generated by using a second modulation structure identical to the first modulation structure to modulate reference light beams which pass through positions corresponding to the positions of the desired lines or spectral components of the spectrum under investigation.

In this apparatus, as in the other known forms of apparatus, an input or output slot of spectrometer is required in order to form the measurement signals. The physical presence of such an input or output slot results in the amount of light energy available at the detector being restricted.

The principal object of the present invention is to provide a spectrometer which is able to carry out spectral analysis on a beam of radiation of relatively large cross-section and high intensity with a corresponding gain in the amount of energy available at the detector. A further object of the present invention is to effect a significant reduction in the complexity of the apparatus used for spectral analysis.

Further objects of the invention will become apparent from the subsequent disclosure and claims.

Although the present invention is particularly directed to apparatus for analysing optical spectra the novel principle involved is by no means restricted to optical spectra and is also readily applicable to apparatus for carrying out spectral analysis on other types of spectra such as X-ray spectra, gamma ray spectra, particle spectra and mass spectra.

In order to satisfy the above objects the invention envisages an apparatus for spectral analysis of a broad beam of radiation having a plurality of spectral components, the apparatus comprising dispersion or separator means for subjecting each of said spectral components to a wavelength/frequency dependent dispersal or separation, a first modulator for imposing a position dependent modulation function on said broad beam of radiation before said beam of radiation falls on said dispersion or separator means, a second modulator for imposing a second position dependent modulation function related to said first position dependent modulation function on said radiation after dispersal or separation by said dispersion or separator means, whereby each of the desired spectral components is subjected to a modulation characteristic of that component, detector means for receiving said radiation after modulation by said second modulator to produce a mixed electrical signal having component signals related to each of the desired spectral components and electronic processing means for separating out each of said component signals.

The above, general form of the invention allows the use of a wide variety of dispersion or selection means and contemplates not only dispersion elements or separators which operate in transmission (for example a prism) but also similar devices which operate in reflection (for example a reflection grating). It will be appreciated that it is only necessary to select in each case a separator or dispersion means which is capable of imposing a wavelength/frequency dependent deflection on the incident radiation.

In one particularly preferred form of the invention there is provided an apparatus for spectral analysis having a dispersion member or separator through which the radiation to be analysed passes, at least one detector positioned after the dispersion member and an electronic processing circuit for detecting spectral components contained in the spectrum. This apparatus is characterized in that:

(a) a first modulator extends spatially parallel to the direction of selection of the dispersion member or separator and has a location dependent modulation function in a direction parallel to the direction of selection is irradiated by the radiation to be analysed, (b) the radiation from the first modulator passes through a dispersion member or a separator onto a second modulator and there develops an image of the first modulator, the second modulator having a location dependent modulation function in a direction parallel to the direction of selection which can be the same as or different from the location dependent modulation function of the first modulator, there being a detector which receives at least substantial parts of the light which passes through the second modulator arranged behind the second modulator, and (c) the structures of the second modulator and of the first modulator execute a movement with a defined speed in the direction of selection.

The modulation functions of the two modulators should preferably have a relationship such that by superposition of the image of the first modulator on the second modulator a combined modulation function of fixed frequency is created at the receiver arrangement, with the size of the frequency depending on the displacement of the image of the first modulator and of the second modulator in the direction of selection.

Furthermore, it should advantageously be arranged that a phase diaphragm device which covers parts of the input beam is so constructed and arranged, approximately in the plane or image plane of the first modulator and/or of the second modulator, that the spatial structure which results from the superposition of the image of the first modulator in the plane of the second modulator, and which contains combination frequencies dependent on the spectral components contained in the radiation, generates a periodic signal as it sweeps over the detector as a result of the movement of the two modulators.

For the purpose of simple evaluation filters associated with the individual spectral components can be contained in the electronic evaluation circuit, with the filters being tuned to the combination frequencies generated by the associated spectral components.

The purpose of the phase diaphragm, or the equivalent subdivision of the detector, is as follows:

It will be appreciated that with a broad beam of radiation all spectral components will normally be present at all points across the beam of radiation. Let us consider a spectral component of wavelength $\lambda$ and let us assume, as will normally be the case, that radiation of wavelength $\lambda$ is to be found at all points across the cross-section of the beam of radiation. If the first modulator moves across the beam of radiation from left to right then, as a result of the position dependent modulation function of the modulator, radiation of wavelength $\lambda$ at the left hand side of the spectrum will be modulated with a first frequency f' whereas, at the same time, radiation of wavelength $\lambda$ at the right hand side of the beam will be modulated with a frequency of f''. After a certain period of time $\Delta t$ the modulator will have moved so that now radiation of wavelength $\lambda$ at the right hand side of the beam of radiation is also modulated by the frequency f'. On recombination at the detector this difference $\Delta t$ represents a phase difference between the signals from the left and right hand side of the beam of radiation. Care must be taken to ensure that this phase difference does not lie in the order of 180° because otherwise the two signals will simply cancel each other at the detector. This is the function of the phase diaphragm. The phase diaphragm can be likened to a coarse grating with periodic transmitting and opaque sections. The positions of the transmitting sections are chosen so that only signals with phases in the range ±45° arrive at the detector. These signals can thus be added without disadvantage. The fact that the phase diaphragm blocks out approximately 50% of the incident light is tolerable because the width of the incident light beam is in any case very much greater than the width of the normal slot of a spectrometer (typically 2000 times greater). It will appreciated that the subdivision of the detector produces a similar effect; either the detector can be arranged as a series of spaced apart detector elements connected in parallel so that signals with unfavourable phases pass through the gaps between the detector elements and only signals with favourable phases are collected, or, alternatively, signals from detector elements with unfavourable phases can be electronically manipulated prior to addition.

Thus, in accordance with the invention, a light beam of relatively large area falls on the first modulator or the phase diaphragm. In the preferred application the useful cross-sectional area of the beam of radiation is considerably larger than the area of the narrow input slot of a conventional spectrometer. As a result of the arrangement of the invention there is created, in the electronic evaluation circuit, in respect of each spectral component that is sought, a characteristic combination frequency of the spatially variable modulation frequencies of the two modulators as received by the detector. These characteristic combination frequencies can be filtered out and used to indicate the intensity of these spectral components.

The size of the combination frequency obtained by superimposing the two modulation frequencies depends on the relative displacement of the two modulators or of the second modulator and the image of the first modulator. The relative displacement of the two modulators is so arranged, depending on the deflection produced by the dispersion member, that a desired combination frequency is associated with the spectral component that is to be detected.

In contrast to the earlier proposal of DE-OS 30 14 646 a modulator is arranged, in accordance with the invention both before and after the dispersion member or separator. The modulators correspond extensively with the modulators of the above named Offenlegungsschrift. As, in accordance with the invention, the radiation does not however enter only a small input slot but instead through the full width of the input modulator the light energy available at the output is greater by a factor of approximately 1000. As a fixed combination frequency is generated in accordance with the invention for each spectral component the signal processing is considerably simpler than with the previously suggested apparatus for spectral analysis.

Although in principle any desired modulation frequencies can be used for the modulators it is preferable, in order to simplify the signal processing, only to use modulation functions which, as a result of the displaced superposition in accordance with the invention, produce constant combination frequencies directly. This is achieved in accordance with the invention by ensuring that the position dependent frequencies $f_1$, $f_2$ of the two modulators depend on the position on the modulator in such a way that the following relationships hold:

$$\frac{df_2}{dx} = A \cdot \frac{df_1}{dx}$$

$$\frac{df_1}{dx} = \text{constant}$$

or $$\frac{df_2}{dx} = -A \cdot \frac{df_1}{dx}$$

$$\frac{df_1}{dx} = \text{constant}$$

where
 $f_1$, $f_2$ are the position dependent frequencies of the first and second modulators,
 x = the position coordinate in the direction of selection, A = the amplification factor of the imaging optics.

In this embodiment the evaluation can take place simply by connecting band pass filters for each of the spectral components that is sought to the detector with the band pass filters being tuned to the associated sum or difference frequencies.

The evaluation is particularly simple if the two modulators are synchronized so that a temporally constant displacement exists between the two modulators. In order to achieve more favourable combination frequencies the two modulators should also preferably have different frequency bands.

The invention can however also be realized with modulators which are not synchronized. In this case it is then necessary for a mixer or synchronous demodulator to be connected to the detector. In the mixer or synchronous demodulator signals with constant combination frequencies corresponding to the available spectral components are formed from reference frequency signals originating from a variable frequency oscillator device synchronized with the modulators (with the tuning of the oscillator being portional to the relative displacement of the modulators), and from the two modulation frequencies, with the signals with constant combination frequencies being passed to the band pass filters, if necessary via a filter. In priciple more than two modulators can be provided and a third modulator can advantageously be arranged in the central slot plane of a double monochromator. When using three modulators the following combination of frequencies can then, for example, be evaluated:

$$f = f_1 + f_2 + f_3 \text{ or}$$

$$f = f_1 - f_2 - f_3 \text{ or}$$

$$F = f_1 + f_2 - f_3 \text{ or}$$

$$f = f_1 - f_2 + f_3$$

Figure 2:
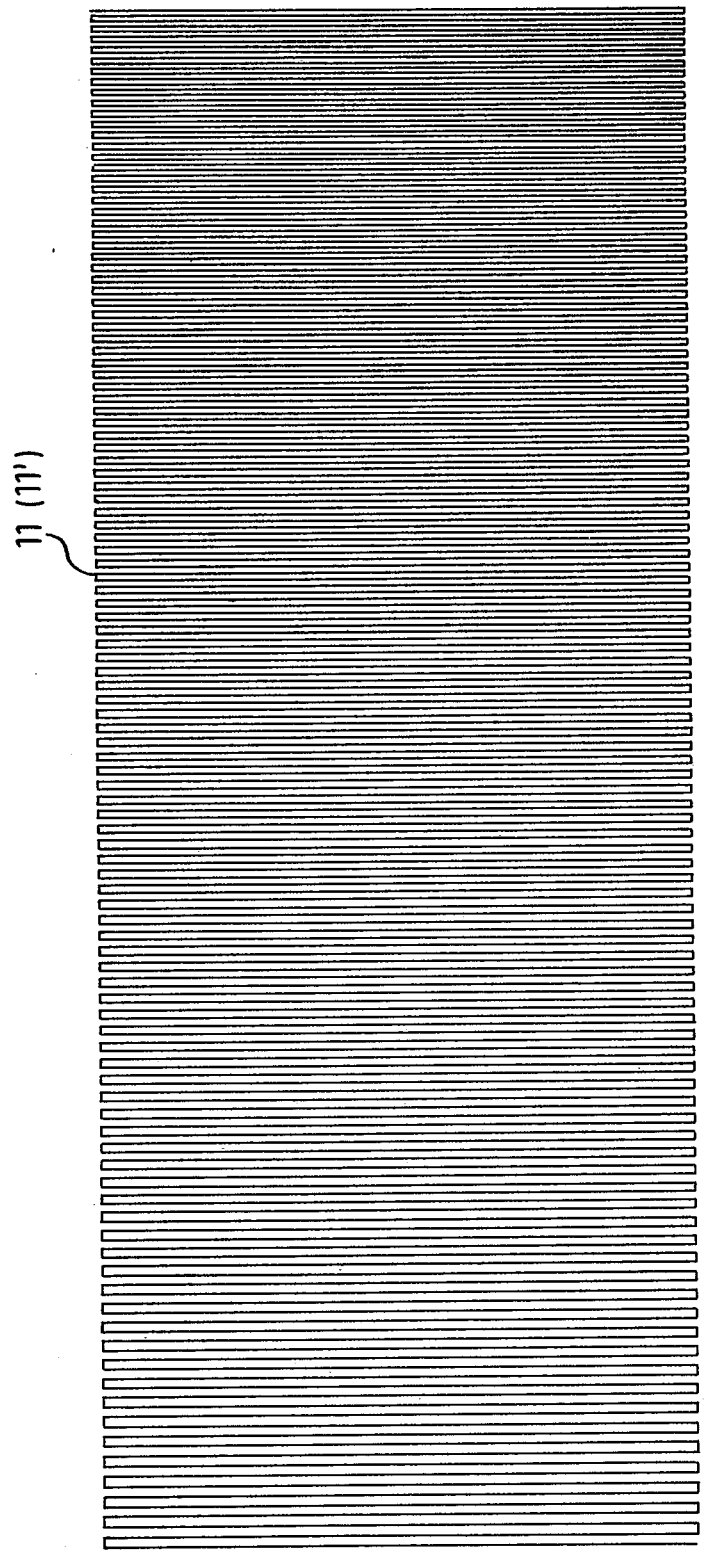

The invention will now be described by way of example only and with reference to the drawings which show:

FIG. 1 a schematic illustration of the optical and electronic arrangement of an apparatus for spectral analysis in accordance with the invention, and FIG. 2 a plan view of one of the modulators used in accordance with the invention.

As seen in FIG. 1 a light beam 9 of relatively large cross-section which contains the optical spectral components to be investigated falls on a grating-like first modulator 11 which, as seen in FIGS. 1 and 2 has a continuously increasing grating constant. The first modulator is imaged on a second grating-like modulator 11' via two lenses 26, which preferably form a telecentric system, and a dispersion member 19 arranged between the lenses. The second modulator 11' has, like the first modulator, a continuously increasing grating constant however, contrary to the illustration of FIG. 1, preferably embraces a different frequency band. By way of example, the modulator 11 can have a frequency band from 400 kHz to 1 MHz and the modulator 11' a frequency band from 300 kHz to 900 kHz based on a uniform movement of the modulators with a speed of 20 m/sec. The combination frequency that is utilized can then lie, for example, in the range from 70 to 100 kHz. The image forming ray path of the imaging optics 10 formed by the lenses 26 and the dispersion member 19 is illustrated in FIG. 1 in broken lines.

Behind the second modulator 11' there is arranged a photoelectric detector in the form of a single photoreceiver 13 which receives all the light passing through the openings of the modulator 11' and generates at its output a corresponding electrical signal which is passed to an electronic processing circuit 15. A phase diaphragm 8 the position dependent frequency of which is significantly smaller than that of the modulators 11, 11' is located in front of the first modulator 11. The local or position dependent frequency (in German Ortsfrequenz) of the phase diaphragm 8 should be related to the combination frequency formed by the modulators 11, 11' as will be later explained in detail in the subsequent functional description.

As a result of the optical arrangement shown in FIG. 1 an image of the modulator 11 is generated on the second modulator 11'. Dotted lines show how a spectral component in the light beam 9 which is not deflected by the dispersion member 19 reaches the modulator 11' through the image forming optics 10. Chain dotted lines show how another spectral component is deflected through an angle α by the dispersion member 19 and falls on the second modulator 11' displaced in the direction of the arrow f'.

If one now imparts a uniform movement to the two modulators 11, 11' at right angles to the optical axis 7 and in and against the direction of selection of the dispersion member 19 respectively (i.e. in the direction of the arrows f, f'), so that the image of the modulator 11 and the second modulator 11' move with constant speed and constant displacement, then for each spectral component a combination modulation function with a different frequency $f_k$ runs in the direction of the arrow f' over the surface of the photoelectric receiver arrangement 13. The phase diaphragm 8 is located in the plane of the input modulator 11 (and/or of the output modulator) so that this movement produces a clear electrical signal at the output of the detector arrangement 13. The phase difference of the combination frequencies of the outermost rays which can pass through the phase diaphragm amount to approximately ±45° related to the central ray through the diaphram 9. The rays which fall on the nontransmitting regions of the phase diaphragm 8 are supressed. Because signals with a relative phase difference of ±45°±±n·360° (here n signifies an integer) can be summed the phase diaphragm 8 has several free openings. The phase diaphragm 8 can also be arranged in the plane of the output modulator 11' or on both sides.

Admittedly some light is lost through the phase diaphragm 8, despite this the energy which passes through the openings of the phase diaphragm 8 is still factors of ten larger than in a conventional method with an illuminated input slot. For small combination frequencies $f_k$ the phase diaphragm 8 has only one or a few large openings whereas, for large combination frequencies, the phase diaphragm has many small openings.

From the energy point of view it is more favourable, in place of the phase diaphragm 8, for the photoelectric detector arrangement 13 to consist not of a single continuous photoreceiver but instead of spatially displaced detectors which are arranged alongside one another. The width of the detectors is so chosen that they can receive signals with relative phases of for example ±45°. The spatially separated arrangement of the detectors thus replaces the phase diaphragm 8.

Signals from detectors with similar phase positions can be directly added. The remaining signals are brought to a similar phase position by means of phase shifters prior to addition. Instead of using a multiple detector it is also possible to arrange at the respective locations beam deflectors which deflect the beam onto approximately four detectors. The output signals of these detectors are then brought into the same phase position with the aid of phase shifters.

It is thus important for the arrangement of the phase diaphragm 8 and/or the photoelectric receiver 13 which is subdivided into individual detectors to be such that the combination frequency on movement of the two modulators 11, 11' in the direction of the arrows f, f' results in as large a signal as possible at the output of the photoelectric detector arrangement.

When the amplification A of the monochromator or equivalent is 1 then the relative phase displacement of the difference frequencies of two rays with the spacing $\Delta x$ when utilizing the difference frequency is given by $$\Delta \phi_D = 360° \frac{\Delta x |x_e - x_a|}{x_e \cdot x_a}$$

where $x_e$, and $x_a$ are the spatial lengths of the periods of the input and output modulators.

If the amplification factor A is less than one then $x_e$ must be multiplied with A if, for example, $\Delta \phi$ is to be measured at the output; (if $\Delta \phi$ is to measured at the input then the calculation must be carried out with $(1/A) \cdot x_a$).

If the sum frequency is evaluated then the opening of the phase diaphragm will be very small. Very many openings must then be utilized. In this case the following equation holds:

$$\Delta \phi_S = \frac{360° \Delta x |x_e + x_a|}{x_e \cdot x_a}$$

Up till now attention has been paid only to the combination frequency for a single spectral component. For other spectral components the deflection through the dispersion member 19 is correspondingly larger or smaller which leads to larger or smaller combination frequencies.

The evaluation is made particularly simple if the two modulators 11, 11' are synchronized with one another, i.e. if the image of the modulator 11 and the modulator 11' move with the same speed and constant displacement. FIG. 1 illustrates by way of a connection line 6 and a schematically illustrated transmission 5 how the two modulators 11, 11' can be driven to execute a synchronous movement of this kind.

As, with the two modulators 11, 11' synchronized in this manner, a defined combination frequency arises for each spectral component at the output of the receiver arrangement 13 it is only necessary to provide, with the exception of amplifiers and filters, band pass filters 17 which are respectively tuned to one combination frequency associated with one of the spectral components. In the embodiment of FIG. 1 it is assumed that the light beam 9 contains three spectral components I, II and III so that only three band pass filters $17_I$, $17_{II}$ and $17_{III}$ are present in the processing circuit 15. Output signals I''', II''' and III''' corresponding to the intensities of the individual spectral components are then present at the outputs of the three band pass filters.

In accordance with the invention it is however not necessary for the two modulators 11, 11' to be synchronized. If the repetition frequencies of the two modulators 11, 11' are not synchronized then the fixed phase coupling 5, 6 is omitted. In place of this, signals representative of the instantaneous relative rotational positions of the modulators 11, 11' are derived from the modulators 11, 11' via the lines 4, 4' and are passed to a variable frequency oscillator device 22 provided in the electronic processing circuit 15. The oscillator device 22 passes a reference frequency or a superposition frequency to a mixer 18 which is positioned in front of the band pass filters 17. The mixer 18 also receives the output signal from the photoelectric detector arrangement 13.

The construction of the variable frequency oscillator device 22 and of the mixer 18 are such that the sum or difference frequencies which are instantaneously associated with the individual spectral components can be transposed to a constant combination frequency by combination with, and in particular by the subtraction of the instantaneous reference or superposition frequency. The output of the mixer 18 is preferably connected via a filter which suppresses undesired mixture products to the low pass filter 17 where the further processing takes place in the above described manner.

In place of the mixer it is also possible, in the same sense, to use synchronous demodulators with time variable reference frequencies. A synchronous demodulator is then required for each spectral component. The attached filter is in this case a low pass filter.

In order to obtain a constant combination frequency for each individual spectral component when superimposing the image of the modulator 11 on the modulator 11', and thereby to obtain a simple evaluation, the following relationships should be observed for the spatial frequencies (in German Raumfrequenz) of the two modulators 11, 11' as a function of position:

$$\frac{df_2}{dx} = A \cdot \frac{df_1}{dx} \quad (1)$$

$$\frac{df_1}{dx} = \text{constant} \quad (2)$$

or $$\frac{df_2}{dx} = -A \cdot \frac{df_1}{dx} \quad (3)$$

$$\frac{df_1}{dx} = \text{constant} \quad (4)$$

where
$f_1$, $f_2$ are spatial frequencies of the first and second modulators 11, 11',
x = a position coordinate,
A = the amplification factor of the image forming optics 10.

In an arrangement which operates in accordance with equation (1) the difference frequencies are evaluated, whereas, in an arrangement which operates in accordance with equation (3), it is the sum frequencies that are evaluated.

As a result of the above described dimensioning of the modulators 11, 11' all the difference or sum frequencies which belong to a spectral component coincide although the rays start from different positions in the plane of the input modulator, i.e. only one band filter 17 is required for each spectral component.

The sum or difference frequencies result from the absolute instantaneous values of $f_1$ and $f_2$. By way of example two identical chopper disks, which are however angularly displaced relative to one another, can be used.

The signal processing can also take place in a similar manner to that of FIG. 8 of DE-OS No. 30 14 646. However, the mixing stages 21 which convert the signal with temporally varying frequency to a signal of fixed frequency are omitted, as are the superposition or reference frequency signals which temporally vary in frequency. The corresponding roles are taken over in the present invention in each case by the other modulator.

In conclusion it can be said that when the above equations (1), (2), or (3), (4) are satisfied, and the modulators are synchronized, no reference frequency is required for processing the signals. The time change of frequency in the first modulator is compensated prior to the photoelectric detector arrangment 13 in the second modulator 11'. A constant combination frequency is thus in each case associated with a specific wave length. A different wave length produces a different constant combination frequency. The combination frequencies (which correspond to the various spectral elements) can also be selected by filters which remain constant in time. Mixers or synchronous demodulators are not required. If one usesthem despite this one obtains a constant reference frequency.

When the equations (1), (2) and (3), (4) are satisfied but the modulators are not synchronized a time variable reference frequency is required for a mixer 18 or synchronous demodulator. This reference frequency is not however to be confused with the reference frequency of DE-OS No. 30 14 646 where the reference frequency is a function of the instantaneous position of the modulator. In the present invention the reference frequency is however a function of the relative positions of the two modulators.

If the amplification factor A of the apparatus of the invention is not equal to 1 then, when determining the combination frequency, it is necessary to used a correspondingly enlarged or reduced image of the first modulator at the position of the second modulator 11'.

If the sum frequencies are evaluated the opening of the phase diaphragm 8 will be very small. It is then necessary to use very many openings.

When using synchronous demodulators for signal processing the phase position of the signal relative to the reference signal for the synchronous demodulator must be taken into account and, if necessary, brought into the correct position by means of phase shifters.

Although the phase diaphragm 8 does not fundamentally restrict the relative shift of the usable combination frequency it does in practice. Specifically, the following relationship holds when utilizing the difference frequency:

$$\text{relative deviation}_{max} = \frac{(f_2 - f_1)_{max}}{(f_2 - f_1)_{min}} < 2 \approx 1,5 \quad (5)$$

When using the summed frequency the maximum relative deviation of the usable combination frequency is given by:

$$\text{relative deviation}_{max} = \frac{(f_2 + f_1)_{max}}{(f_2 + f_1)_{min}} < 2 \approx 1,5 \quad (6)$$

It is basically possible to operate with a relative deviation greater than 2. The sensitivity which can then be achieved for the least favourable combination frequency is however reduced. Admittedly the null points of the sensitivity can be blurred if the individual apertures of the phase diaphragm 8 are of different width or it the individual apertures lie obliquely to the spectrum. Of course the maxima in the sensitivity function are then also reduced. Furthermore, the phase diaphragm 8 can be temporally variable, for example discontinuous, by alternately inserting two different phase diaphragms, or continuous, by mounting a phase diaphragm 8 with continuously varying characteristics on a drum. In time average the sensitivity minima will in this case also be blurred.

Electronically controllable modulators such as liquid crystals can also be used as phase diaphragms. It is possible, particularly in this case, to change rapidly between several different phase diaphragms. It is useful only to switch on the respective signal processing channels when the sensitivity of the respective combination frequency is at an optimum.

By suitable dimensioning of the phase diaphragms it is possible to blend out undesired physical (optical) spectral regions (position of the null points of the sensitivity).

The resolution of the method can be restricted, in particular by optical errors in the monochromator. I.e. the combination frequency which is produced by a specific wave length can be somewhat dependent on the position in the input or output plane of the monochromator. If necessary such errors can however be corrected, for example by arranging several detectors in the output plane of the monochromator, by processing the signals from these detectors independently and only then adding the corresponding output signals.

All the modulators described in DE-OS No. 30 14 646 can also be used in accordance with the invention. The application of the invention is thus not restricted to rotating or longitudinally oscillating modulators but also extends to non-mechanically moved modulators.

Furthermore the invention can also be used for non-optical spectra, for example X-ray spectra, gamma spectra, particle spectra or mass spectra. In this case, if required, a separator is used in place of the dispersive element.

Although one normally only uses the fundamental waves of the modulation or reference or combination frequencies; it is however also possible to operate with harmonics of these signals. This is in particular possible if the curve shape of the modulator function is not sinusoidal but instead rectangular.

The selection does not have to take place using sinusoidal frequency components but can also take place by using other periodic signals with other curve shapes for example rectangular curve shapes.

Moreover, the arrangement can be used in combination with the methods described in patent application No. P 30 29 945.

When in the specification or in the claims there is requirement for one modulator to be imaged on the other an image with "shadow images" can also be used for this image.

It will be appreciated by those skilled in the art that many modifications can be made to the described arrangements without departing from the scope of the present teaching. In particular it will be appreciated that the phase diaphragms described in this specification can also be used with benefit in some prior art spectrometers.

Finally it should be emphasised that the present invention can be used with broad beams of light and particularly with divergent beams of light or other types of radiation. In other words the invention is not restricted to parallel beams of radiation.

I claim:

1. An apparatus for spectral analysis of a broad beam of radiation having a plurality of spectral components, the apparatus comprising dispersion means having a direction of selection for subjecting each of said spectral components to a frequency dependent dispersal in said direction of selection; a first modulator having a first modulation structure, means for moving said first modulation structure parallel to said direction of selection for imposing a first position dependent modulation function on said broad beam of radiation before said beam of radiation falls on said dispersion means; a second modulator having a second modulation structure, means for moving said second modulation structure parallel to said direction of selection for imposing a second position dependent modulation function related to said first position dependent modulation function on said radiation after dispersal by said dispersion means, whereby each of the desired spectral components is subjected to a modulation characteristic of that component, detector means for receiving said radiation after modulation by said second modulator to produce a mixed electrical signal having component signals related to each of the desired spectral components, and electronic processing means for separating out at least one of said component signals whereby to obtain information on the related spectral component.

2. An apparatus in accordance with claim 1 and wherein means are provided for ensuring detection only of modulated spectral components having favourable phases.

3. An apparatus in accordance with claim 2 and wherein said means comprises a phase diaphragm.

4. Apparatus in accordance with claim 1 wherein optical means is provided for superimposing an image of said first modulation structure on said second modulation structure.

5. Apparatus in accordance with claim 4, wherein said first and second modulation structures have a relationship such that on superposition of said image of said first modulation structure on said second modulation structure a combination modulation function on fixed frequency is created, with the size of the frequency depending on the displacement of said image of said first modulation structure relative to said second modulation structure in said direction of selection.

6. Apparatus in accordance with claim 1, wherein filters associated with the individual spectral components are contained in the electronic processing circuit, with the filters being tuned to the combination frequencies generated by the associated spectral components.

7. Apparatus in accordance with claim 4, wherein the respective position dependent frequencies of said first and second modulation structures are a function of their locations on the respective modulators in such a way that one of the following relationships holds:

$$\frac{df_2}{dx} = A \cdot \frac{df_1}{dx}$$

$$\frac{df_1}{dx} = \text{constant}$$

and $$\frac{df_2}{dx} = -A \cdot \frac{df_1}{dx}$$

$$\frac{df_1}{dx} = \text{constant}$$

where
$f_1$, $f_2$ are the position dependent frequencies of said first and second modulation structures respectively,
x = the position coordinate in the direction of selection,
A = the amplication factor of said optical means.

8. Apparatus in accordance with claim 1, wherein said first and second modulation structures in that the two modulators are synchronized.

9. Apparatus in accordance with claim 8 wherein said first and second modulation structures have different frequency bands.

10. Apparatus in accordance with claim 9 wherein the frequency band of said first modulation structure extends from 400 kHz to 1 MHz and that of said second modulation structure from 300 Khz to 900 Khz.

11. Apparatus in accordance with claim 8 wherein band pass filters which are tuned to the sum or difference frequencies associated with each of the spectral components that is sought are connected to said detector if necessary via.

12. Apparatus in accordance with claim 11, wherein the movements of said first and second modulation structures are not synchronized; wherein means are provided for tuning a variable frequency oscillator to produce reference frequency signals in dependence on the relative displacement of said first and second modulation structures, wherein there is connected to said detector one of a mixer and a synchronous demodulator, in which signals with constant combination frequencies corresponding to the available spectral components are formed from said reference frequency signals and from said mixed electrical signal; and wherein said signals with constant combination frequencies are passed to said bandpass filters, if necessary via a filter.

13. Apparatus in accordance with claim 3, wherein said phase diaphragm is time variable.

14. Apparatus in accordance with claim 3, wherein one of the width and position of said phase diaphragm is variable.

* * * * *